(12) United States Patent
Watts et al.

(10) Patent No.: US 9,140,233 B2
(45) Date of Patent: Sep. 22, 2015

(54) WIND POWER GENERATION SYSTEM (75) Inventors: Philip Watts, Redondo Beach, CA (US);
James V. Eats, Long Beach, CA (US)

(73) Assignee: Garden Energy, Inc., Long Beach, CA (US)

( * ) Notice: Subject to any disclaimer, the term of this patent is extended or adjusted under 35 U.S.C. 154(b) by 490 days.

(21) Appl. No.: 12/931,538

(22) Filed: Feb. 2, 2011

(65) Prior Publication Data

US 2011/0211966 A1 Sep. 1, 2011

Related U.S. Application Data (60) Provisional application No. 61/337,356, filed on Feb. 2, 2010.

(51) Int. Cl.
*F03D 1/06* (2006.01)

(52) U.S. Cl.
CPC ............ *F03D 1/0633* (2013.01); *F03D 1/0675* (2013.01); *F05B 2240/30* (2013.01); *F05B 2250/70* (2013.01); *Y02E 10/721* (2013.01)

(58) Field of Classification Search
CPC ... F03D 1/0633; F03D 1/0641; F03D 1/0675; F03D 1/0683
USPC ............... 416/235, 223 R, 236 R, 231 B, 228
See application file for complete search history.

(56) References Cited

U.S. PATENT DOCUMENTS

| | | | | |
|---|---|---|---|---|
| 1,793,339 | A * | 2/1931 | Brogmus | 416/91 |
| 4,886,421 | A * | 12/1989 | Danson | 416/236 R |
| 6,940,185 | B2 * | 9/2005 | Andersen et al. | 290/44 |
| 7,234,921 | B2 * | 6/2007 | Shchukin et al. | 416/1 |
| 2002/0005458 | A1 * | 1/2002 | Carter et al. | 244/35 R |
| 2006/0280614 | A1 * | 12/2006 | Quell et al. | 416/236 R |
| 2007/0222223 | A1 * | 9/2007 | Bagepalli et al. | 290/55 |
| 2008/0124216 | A1 * | 5/2008 | Liao | 416/24 |
| 2008/0273974 | A1 * | 11/2008 | Becker | 416/7 |
| 2008/0290213 | A1 * | 11/2008 | Dacre | 244/12.5 |
| 2009/0028719 | A1 * | 1/2009 | Teraoka et al. | 416/223 R |
| 2011/0176926 | A1 * | 7/2011 | Corten | 416/223 R |

* cited by examiner

*Primary Examiner* — Nathaniel Wiehe
*Assistant Examiner* — Michael Sehn
(74) *Attorney, Agent, or Firm* — Edell, Shapiro & Finnan, LLC (57) ABSTRACT

A wind turbine blade forming a root at an inner end, a tip at an outer end, a plurality of power sections intermediate the root and the tip, and a plurality of aerodynamic section dividers located intermediate each of the other sections. The aerodynamic section dividers are configured to aerodynamically isolate their adjoining sections to limit the lateral flow of air between them while in use on the wind turbine. The blade has a low aspect ratio and is operated at a high advance rate. The aerodynamic section dividers are close enough together to soften the stall characteristics of the blade, and thus the blade can be operated at high angles of attack.

21 Claims, 7 Drawing Sheets

WIND POWER GENERATION SYSTEM

This application claims the benefit of U.S. provisional Application No. 61/337,356, filed Feb. 2, 2010, which is incorporated herein by reference for all purposes.

The present invention relates to a wind-power electrical generation system having aerodynamic elements providing a greater ability to capture kinetic energy by improving lift, reducing drag, and/or expanding the operating envelope of the generator.

BACKGROUND OF THE INVENTION

The use of windmill blades has been known for facilitating varied activities such as pumping water, processing grain and supplying electricity. As early as the 1930s, horizontal axis wind turbines became popular and cost effective for the supply of electricity where the turbine drive train apparatus was mounted horizontal to the ground. It is desirable for wind generator blades to have high lift, minimum drag, and a broad operating envelope.

For a typical wind power generator, the kinetic energy extracted from the wind by wind turbine blade lift is converted into torque. The torque is converted into electricity using a drive train connected from the blades to a generator and power converter, which converts the resulting direct current electrical energy into smooth electrical power that can be transmitted on conventional power distribution circuits. Commercial wind turbines generally are on very tall towers (e.g., 300 ft.) in the atmospheric boundary layer, with lower shear gradients, and larger eddy sizes. The towers are typically 1.5 to 2.5 the blade length.

Commercial wind turbines typically have long, thin blades (e.g., 150+ ft.) which lead to very high tip speeds, and thus have to address significant differential loading and performance concerns over the length of the blades. As a consequence of their length, blades often approach the limits of material strength, and are sensitive to the magnitude of rotational and aerodynamic loading.

Wind turbines placed on lower towers (e.g., 75 ft) are most likely immersed in the turbulent mixing layer of the atmosphere. Wind turbine energy capture in its specific atmospheric regime and site location have effects on all the downstream design parameters, including the nacelle, blades, hub, drive train, generators, power quality, and controls.

Minor boundary layer disruptions (e.g., turbulence) interacting with a wind turbine blade appear as variations in effective angle of attack, and can lead to lateral flow and flow separation from the low pressure side of the blade. Such separation (e.g., stall) negatively impacts performance, and potentially can lead to failure of the blades (which are typically large flexible structures). Controlling flow separation is generally seen as desirable, and turbines are typically configured to avoid stall.

The improvement of wind turbine performance and the regulation of power generation by the rotation of the blades about their lateral axes in real time (to optimize their angles of attack) are known. Typical blades are configured to stall at angles of attack in the range of 10° to 12°, and the blades are operated at angles of attack in the range of 4° to 6°, thereby keeping the blades relatively safe from stalling in low to moderate turbulence conditions. Sometimes more conservative, low stall airfoil designs are used, which might provide for stall at 14° to 15°, and which have larger cross-sections that add structural strength. Such airfoils are less aerodynamically efficient, having lift-to-drag ratios in the range of 40 to 60.

It is understood there exists a need for improved blades and wind power generation systems. Preferred embodiments of the present invention satisfy these and other needs, and provide further related advantages.

SUMMARY OF THE INVENTION

In various embodiments, the present invention solves some or all of the needs mentioned above, providing improved blades and wind power generation systems.

Embodiments of the invention typically provide a wind turbine blade for use on a horizontal axis wind turbine. The blade is in the form of a body extending along a lateral dimension. The body forms a plurality of laterally connected sections, including one or more aerodynamic section dividers configured to aerodynamically isolate their adjoining sections such that lateral flow of air between the adjoining sections is limited while in use on the wind turbine. The blade is made with a small aspect ratio, and is operated at much higher speeds than is typically done.

Advantageously, the aerodynamic section dividers, when appropriately placed, soften the stall characteristics of the blade. As a result, high lift coefficient airfoils may be used at high angles of attack. The short blades provide structural stability and lower rotational moments of inertia. As a result, blades provide increased torque and efficiency, as well as more tolerance to atmospheric turbulence over a wider productive operating range in varying types of atmospheric conditions.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them. Furthermore, there is no intent to be bound by any expressed or implied theory presented in this application.

Figure 1:
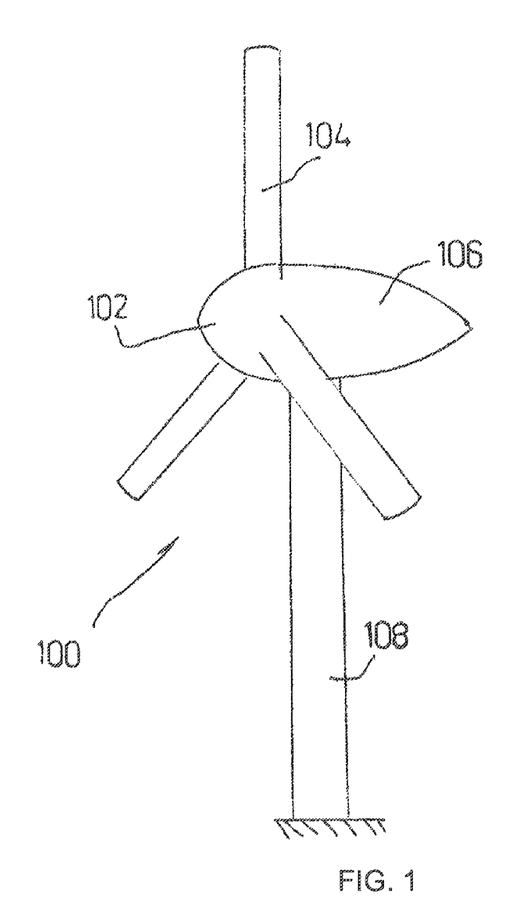
FIG. 1 is a perspective view of a wind-power electrical generation system embodying the present invention, including a plurality of blades.
Figure 2:
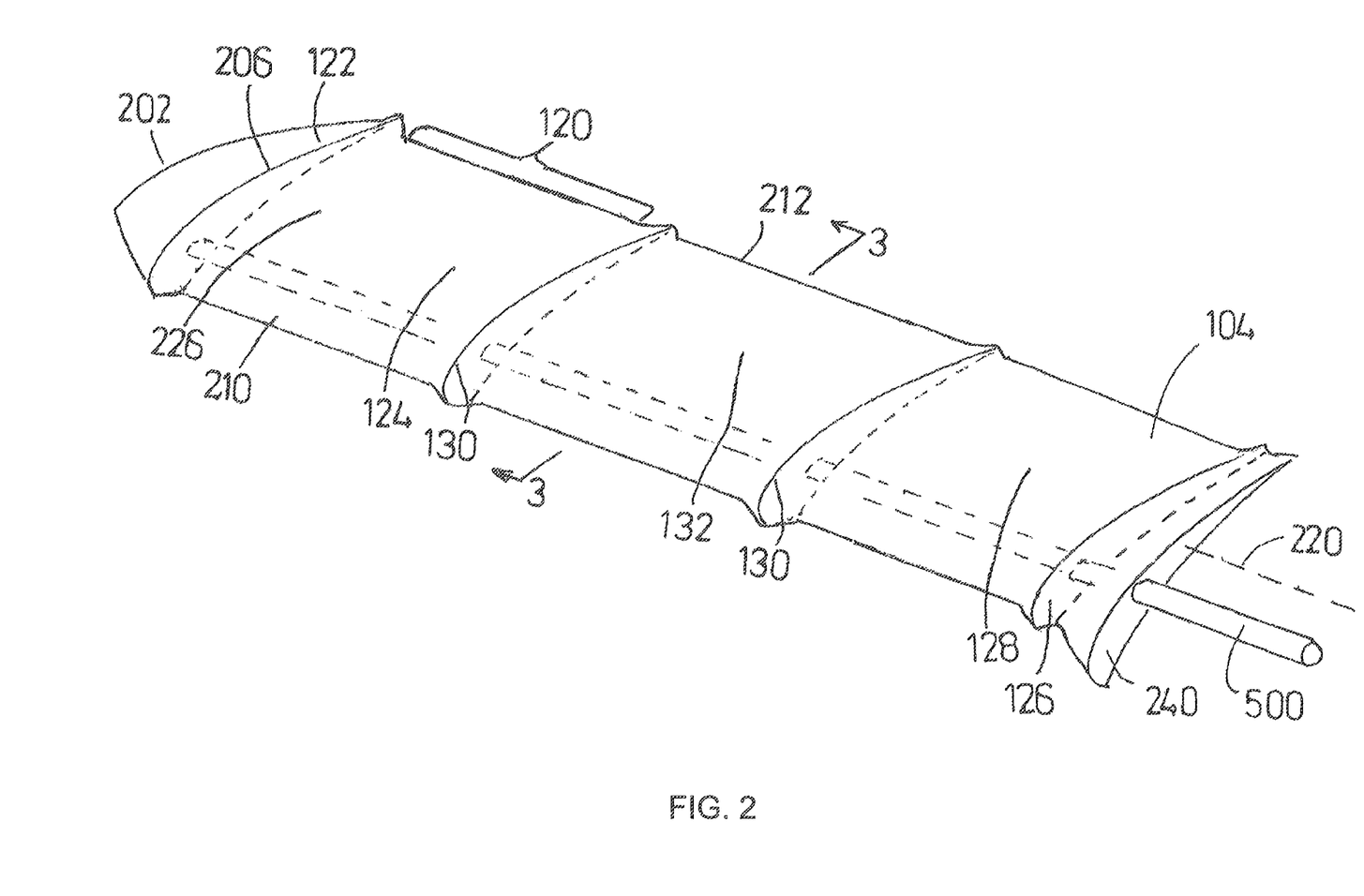
FIG. 2 is a perspective view of a section of one of the plurality of blades depicted in FIG. 1.
Figure 3:
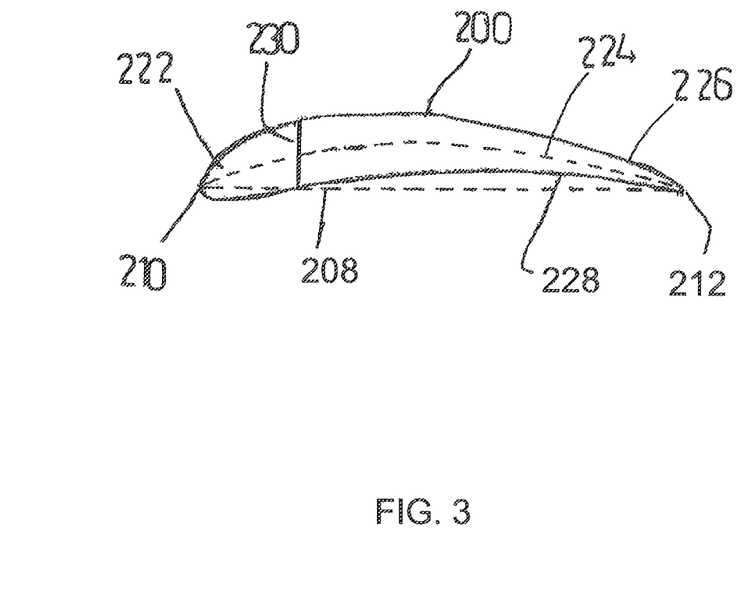
FIG. 3 is a cross-sectional view of the blade section depicted in FIG. 2, taken along lines 3-3 of FIG. 2.

Typical embodiments of the present invention reside in a wind-power electrical generation system providing a greater ability to capture kinetic energy from wind. With reference to FIGS. 1 to 3, a first embodiment of a wind-power electrical generation system 100 includes a hub 102 or nose cone which houses various electrical and mechanical turbine components. A blade group, including one or more (and typically an odd-numbered plurality of) blades 104, attaches to the hub 102 or nose cone. A nacelle 106 houses additional mechanical and electrical components for the wind turbine 100, and attaches to a wind turbine tower 108. The nacelle supports the blade group while allowing it to rotate around a horizontal axis of blade rotation.

The blade 104 forms a number of sections, including a tip 202, a root 240, and one or more (and in this case three) power sections 120. The blade further forms four aerodynamic section dividers 206, including a tip-divider 122 that aerodynamically separates the tip 202 from an outermost power section 124 of the three power sections, a root-divider 126 that aerodynamically separates the root 240 from an innermost power section 128 of the three power sections, and two intermediate-dividers 130 that aerodynamically separate the innermost power section from an intermediate power section 132 of the three power sections, and the intermediate power section from the outermost power section, respectively. The aerodynamic section dividers provide a degree of aerodynamic isolation between the respective sections that they separate.

The tip section begins at least 9/10 of the distance from the root to the far end of the tip (i.e., the span). It is configured with a semi-elliptical or parabolic planform so as to minimize the tip vortex and blade noise. Additionally, the tip angle of attack smoothly varies from its inner end (next to the tip-divider), where the angle of attack matches the angle of attack of the adjoining power section, to the tip outer end, where the effective angle of attack (with the wind) is zero in normal operating conditions. This reduces the aerodynamic loading of the blade tip, reduces the tip vortex strength and reduces the blade noise.

It should be noted that the effective angle of attack at a given lateral location on the blade is determined by the structural angle of attack of that portion of the blade with respect to the direction the wind turbine is facing, the speed with which the blades are rotating, and the lateral distance of that location from the center of rotation. It is the effective angle of attack that determines the aerodynamic loading of the blade.

The width of the dividers is the same as, or on the order of, the maximum airfoil thickness 230 of the immediately adjoining portions of the adjacent power sections. The dividers extend beyond the leading edge 210 and trailing edge 212 by an amount similar to that maximum airfoil thickness 230. The height of the dividers is a substantial fraction (e.g., as large as, or nearly as large as) of the maximum airfoil thickness 230 of the immediately adjoining portions of the adjacent power sections.

At any given lateral location in each of the power sections, each blade 104 (in cross-section) defines an airfoil that is characterized by an airfoil shape 200 and a straight chord line 208 (line segment) extending between a leading edge 210 and a trailing edge 212 of the blade 104. The length of the chord line 208 between the leading edge 210 and the trailing edge 212 is the chord of the airfoil at that lateral location. The airfoil shape and the chord remain substantially constant over the working portions (i.e., the power sections) of the blade. In variations of the present embodiment, the blade may be characterized by a plurality of different cross sectional airfoil shapes located at different power section locations along the lateral axis. The cross sectional airfoil shapes may be selected for the various fluid conditions encountered by different portions of the blade 104 during operation.

The cross sectional airfoil shape 200 of a given power section 120 establishes certain known characteristics, including a nose 222, an airfoil thickness 230 measured perpendicular to the chord line 208, a mean camber line 224 (which is not necessarily straight), the leading edge 210, and the trailing edge 212. In variations, the nose 222 may have a variety of shapes, e.g., it may be thin, round, flat, triangular, or the like. At any given location, the camber of the cross sectional airfoil shape 200 of the blade 104 is the distance between the mean camber line 224 and the chord line 208, measured perpendicular to the chord line. The camber ratio is the maximum camber divided by the chord. The blade 104 may also include a large degree of camber signifying a large divergence between the mean camber line 224 and the chord line 208. The camber characteristic of the blade 104 may include a smoothly varying surface made up of an upper surface 226, and a lower surface 228. The upper surface is referred to the low-pressure side of the blade, and the lower surface is referred to the high-pressure side of the blade, because that is the condition in which they operate for normal blade operation.

Advantageously, the dividers help to minimize lateral airflow along the length of the blade, thereby limiting airflow separation (i.e., stall) from occurring on that side of the blade. For example, the tip-divider 122 depicted is on the low-pressure side of the blade, and helps to limit blade tip vortices caused by air flowing around the tip from the high-pressure side to the low-pressure side of the blade. Likewise, the root-divider 126 helps to limit vortices formed at the root. Typically these two dividers are within one chord of the tip and root, respectively.

The intermediate-dividers 130 may be positioned at locations where the largest lateral flow is expected in high angle of attack scenarios. Candidate locations include regions of rapidly changing lift along the lateral axis. This may be determined analytically, experimentally and/or through experience. More generally, the various dividers are placed in such a manner that minimizes parasitic flows and facilitates a clean flow into the wake of the blade, allowing control and optimization of the structure of the wake.

The positioning of the dividers may be based upon a number of aspects of the blade geometry, such as the length of the power sections as compared to their chord, and such as locations of any blade discontinuities e.g., the blade ends, and others if they exist. For example, it can be seen that the power sections of the present embodiment extend laterally between the dividers for a distance that is on the order of magnitude of the chord. The size and shape of the wind turbine hub and/or nacelle, and other related structures, may also impact the selection of divider location.

As the blades spin, outer sections of the blade travel at significantly higher speeds than inner sections. Thus, the wind effectively arrives at the different power sections traveling in different directions (i.e., at different angles of attack). The blades are configured with a twist angle along the span (or at least in the power generation sections) that follows the natural pitch angle established by this variation in arrival angle. In other words, each lateral location of each power section 120 has an angle of attack appropriate to compensate for the effect of its speed on the effective wind direction. As a result, outer power section locations are angled upward (pitched up) relative to inward power generation sections. This provides for the effective angle of attack (relative to the wind) to be similar for each power section. Regularly placed intermediate-dividers 130 (e.g., laterally spaced at distances on the order of a chord) significantly reduce lateral flow between the power sections, and thus limit separation due to the lateral flow. The dividers thus partially neutralize the effect (on the angle of attack) of turbulent wind energy that occurs.

Figure 4:
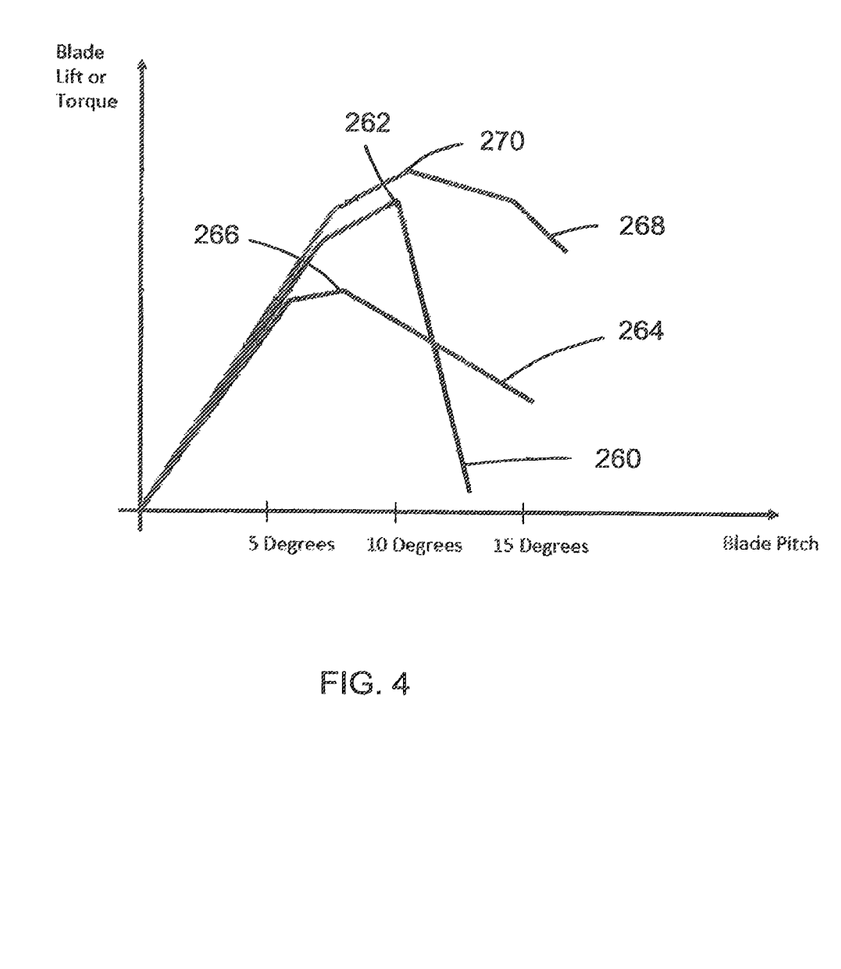
FIG. 4 is a graph of the stall characteristics of the embodiment of FIG. 1, compared to prior art technologies.

FIG. 4 depicts the significant improvement in stall characteristics provided by the present embodiment. As was previously described, a typical wind power generation blade might have stall characteristics 260 that provide for a sharp stall after reaching an angle of attack in the range of 10° to 12° that provides a maximum blade lift and hub torque level 262. In a sharp stall, the blade lift and hub torque fall off sharply when surpassing the angle at which the blade lift and hub torque are maximized. To avoid the risks of stalling in turbulent air, such blades are generally operated at angles of attack in the range of 4° to 6°.

To achieve slightly higher blade lift/torque levels in use, some prior art designs use a more conservative, low-stall airfoil design. Using such a design, a wind power generation blade might have stall characteristics 264 that provide for a soft stall after reaching an angle of attack providing a maximum blade lift and hub torque level 266. In a soft stall, the blade lift and hub torque fall off slowly (as compared to a sharp stall) when the angle of attack surpasses the level at which the maximum blade lift and hub torque are reached. This provides for higher angles of attack to be achieved, and therefore the system can risk a significantly closer approach to the maximum blade lift and hub torque level 266 without increasing the risk associated with a significantly stalled blade from wind direction instability (i.e., wind turbulence). Nevertheless, with such airfoils, a significant price is paid in total achievable blade lift and torque due to their conservative designs, as they are typically less aerodynamically efficient, having substantially lower maximum blade lift and torque levels, and lift to drag ratios in the range of 40 to 60.

The present embodiment provides for significantly higher blade lift and torque to be achieved without a loss of aerodynamic efficiency. Highly efficient airfoils are used to achieve higher blade lift and torque levels. Therefore the blade has stall characteristics 268 providing for a high maximum blade lift and hub torque level 270. Nevertheless, because the aerodynamic section dividers 206 limit lateral airflow and thus resist stall, the embodiment provides for a very soft stall, and thus the blades can be safely run at a much higher angle of attack to more closely approach the high maximum blade lift and hub torque level 270.

As is known in the art, the turbine is pitch regulated, i.e., the hub is configured with an actuation system and a control system configured (e.g., programmed) to actuate the blades through a range of pitch angle positions with respect to the hub. Because of the soft stall characteristics 268 of the present embodiment allow safe approach to the maximum blade lift and hub torque level 270, the control system is configured to operate the actuation system such that the blades operate at a high lift level. More specifically, the blades are operated to use effective pitch angles (relative to the wind) ranging up to greater than 8 degrees, and/or greater than 10 degrees (e.g., in a range of 8 to 12 degrees or 10 to 14 degrees).

The control system is also configured to vary the pitch angle positions when a recognized failure mode of the wind turbine is detected. Included in the range of pitch angle positions are ones configured for a negative effective pitch angle with respect to the wind. The blade pitch angles are varied to stop the blades from driving the hub in rotation (i.e., the blades are neutralized), and are further varied to create aerodynamic braking of the rotating blades if it is appropriate for the particular failure mode. The aerodynamic braking is accomplished by using pitch angle positions that lead to negative effective pitch angles that slow the speed of rotation. In an optional aspect of this feature, the actuation system is configured with independent blade pitch actuators, such that the pitch angle position of each blade may be controlled independent of the other blades. Thus, for appropriate failure conditions, a potentially failing blade may be neutralized while the remaining blades are available for aerodynamic braking.

The rotation rate of a blade is typically described by the advance ratio, which is defined as the tip speed of the blade divided by the wind speed. The control system is further configured to vary the pitch angle positions (and thus the effective pitch angles) such that the turbine operates at a substantially constant advance ratio up to a maximum power generation level, and then at a substantially constant tip speed so long as the maximum power generation level is maintained. Optionally, the control system may be further configured to neutralize the blades when the turbine is operating below a cut-in threshold. That threshold may be based on a minimum wind speed, a minimum power generation level, or even predicted minimum wind speeds or power generation levels (such as by the time of day).

With reference to FIGS. 1-4, it is to be understood that the airfoil shape 200 may be any of a wide variety of types, and are not limited to highly efficient types. The more preferred are generally high efficiency types, which may include airfoil shapes characterized by a maximum camber of greater than 8% of chord, a maximum lift coefficient greater than 1.5 throughout the power generation sections, and a maximum lift to drag ratio greater than 45, and possibly greater than or equal to 100. Typical lift coefficient values of 0.6 and typical lift to drag ratios of about 40 are presently known in the wind power industry. Many likely candidate airfoil shapes 200 may have not been used for wind turbine blades because they are relatively thin, highly cambered, and have a sharp stall behavior that can cause heavy loading to blades. The present configuration softens their stall characteristics, making them usable for wind power blades. Possible airfoils of this type include the Eppler 420, Eppler 423, GOE 244, GOE 440, GOE 448, GOE 523, GOE 525, FX 74-CI5-140, NACA 9414, CH10, and modifications thereof. The airfoil shape 200 may be varied between power sections, as the intermediate-dividers 130 will limit lateral flow between them that might occur due to their differing geometries. It should be noted that the root, tip and divider sections may have significantly lower lift coefficients than the power sections.

The blade planform (i.e., the view of the low-pressure surface in a direction substantially normal to the chord line) is substantially different from typical, modern power generation blades. For a blade of comparable power generation potential, the present blade is significantly shorter and has a significantly larger chord than might be expected for a blade providing comparable power generation levels. The aspect ratio, which for the purposes of this application should be understood as the maximum lateral span divided by the mean chord, is greater than 4 and less than 6. Typical aspect ratios of 10 to 20 are presently known in the wind power industry. It has a maximum thickness 230 which is less than 15% of the chord, and a nose radius either less than 8% of the chord or less than 6% of the chord. Typical maximum thicknesses of 20% or more of the chord are presently known in the wind power industry. The planform is further characterized by a constant chord throughout the power generation sections.

Because the blades aspect ratios are small compared to modern blades of a comparable power generation capability, they are structurally far more robust than the comparable blades. Thus, despite having more slender maximum thicknesses, the present blades can operate at much higher rotation rates while remaining within safe structural tolerances. The present embodiment is configured to operate at an advance ratio of greater than 8, and optionally at an advance ratio of greater than 10 (in wind conditions for which that advance ratio would not exceed power generation limits). This is significantly larger than industry standard advance ratios, which are typically 4 to 6. The high advance ratio reduces the effective variation in wind angle of attack due to air turbulence, further reducing the risk of stall. Advantageously, the high advance ratio may allow for the hub to directly drive a generator without the need for a typical gearbox (or needing only a very simple gearbox). Gearboxes can be noisy and trouble-prone devices.

Because the blade is extremely tolerant to turbulence, the wind turbine may be fully embedded in the turbulent atmospheric layer from 75 to 150 feet, rather than the much higher altitudes of modern power generation systems. This, combined with the shorter blade lengths, provide for a wind tower than is less obtrusive, and easier to put up and maintain.

The airfoils of the power sections are pitch varied around a common point (i.e., along a straight line extending laterally through the blade). That point is situated at the airfoil center of moment, and can define the location of a structural spar.

The blade may be plastic, metal, composite, or resin impregnated. It will typically be of materials that are light, rugged, and sturdy. The upper surface 226 and the lower surface 228 of the blade 104 may be formed by attaching resin impregnated materials, engineered plastic, or sheet metal to a form that establishes the cross sectional airfoil shape 200. For smaller blades, the blade 104 may be unitary or molded or machined from a single material resembling hard foam or engineered plastic.

In sum, the performance benefits provided by the aerodynamic section dividers include achievement of a more attached flow over the blade 104 (as compared to a blade without the dividers), the use of increased blade angles of attack, the achievement of increased blade lift, decreased blade drag, and reduced blade tip and blade root vortices. The blade is robust, and may be operated at higher advance ratios. The resulting overall wind turbine advantages are several, including increased torque and efficiency, shorter and stronger blades, more tolerance to atmospheric turbulence and a wider productive operating range in varying types of atmospheric conditions. Moreover, the aerodynamic section dividers provide a broad plateau of nearly constant lift to be generated over a broad range of angles of attack, which allows the blade to output a nearly constant torque even if the wind varies due to turbulence.

An embodiment of the invention has been tested in various field wind conditions. The blade produced substantially more lift over a wide variety of wind speeds than similar sized blades. More kinetic energy was received from the wind, creating greater torque at the hub to generate greater amounts of electricity. This significant improvement in turbine efficiency may provide for greater return on investment capitol, and thereby speed the adoption of wind power generation.

Aerodynamic Section Dividers

A wide variety of aerodynamic section dividers are envisioned within the scope of the invention. This variety includes a wide range of protrusions and a wide range of voids (e.g., gaps in the low-pressure surface of the wing).

Figure 5:
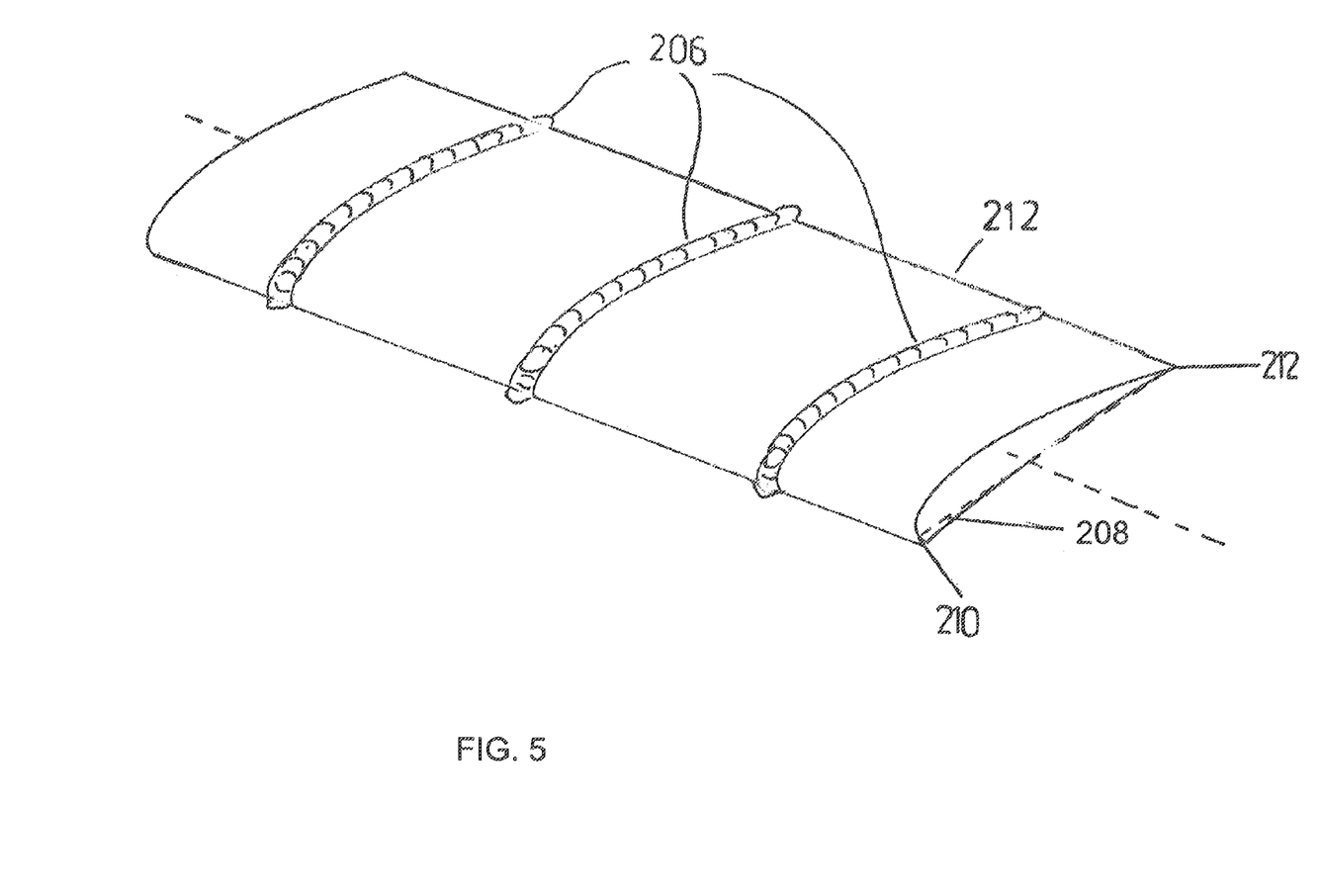
FIG. 5 is a section of a more generic blade of the type depicted in FIG. 2.
Figure 6:
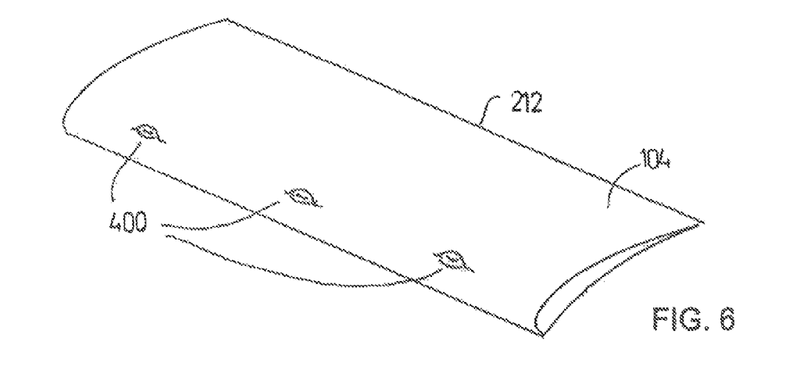
FIG. 6 is a perspective view of a section of a second embodiment of one of the plurality of blades depicted in FIG. 1.
Figure 7:
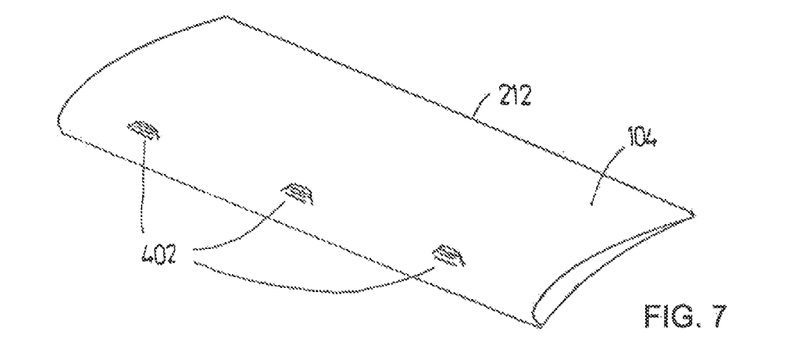
FIG. 7 is a perspective view of a section of a third embodiment of one of the plurality of blades depicted in FIG. 1.
Figure 8:
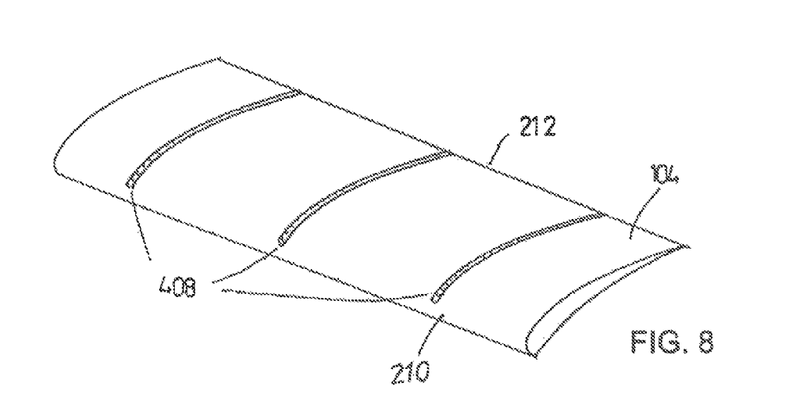
FIG. 8 is a perspective view of a section of a fourth embodiment of one of the plurality of blades depicted in FIG. 1.
Figure 9:
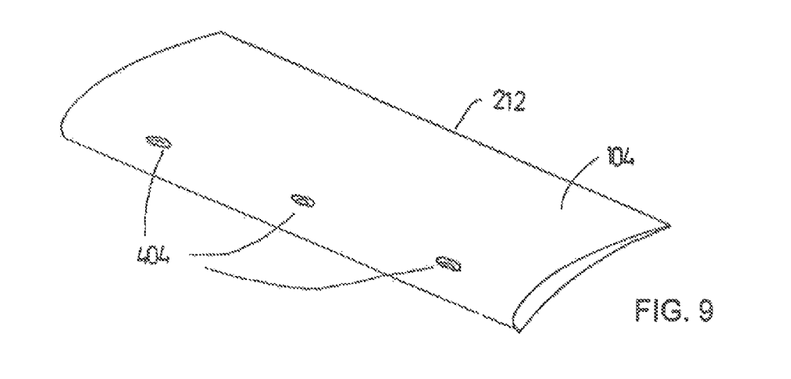
FIG. 9 is a perspective view of a section of a fifth embodiment of one of the plurality of blades depicted in FIG. 1.

With reference to FIGS. 3 and 5 to 9, the aerodynamic section dividers of the first embodiment (a portion of a more generic version of which is depicted in FIG. 5) are protrusions in the shape of a ridge 206 that extends chord-wise from the leading edge 210 to the trailing edge 212 across the low-pressure surface of the blade. The ridge is aligned with the chord line 208, and extends out forward of the leading edge and aft of the trailing edge.

Figure 10:
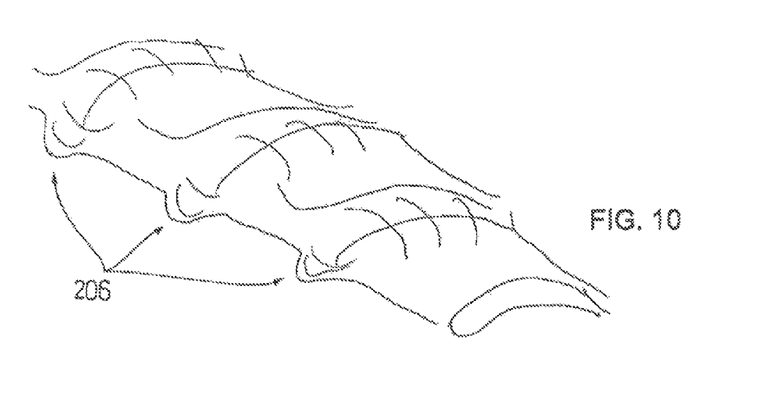
FIG. 10 is a perspective view of a section of a further embodiment of one of the plurality of blades depicted in FIG. 1.
Figure 11:
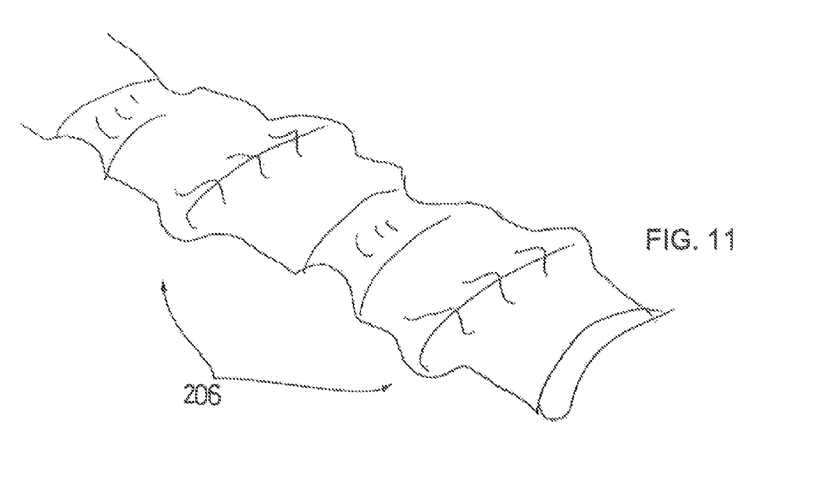
FIG. 11 is a perspective view of a section of an additional embodiment of one of the plurality of blades depicted in FIG. 1.

Other variations of ridges may have a variety of geometrical shapes, including ones with sharp edges and ones that smoothly blend into the airfoil along the span (206 in FIGS. 10 and 11). Ridge heights and widths may vary to be larger or smaller than the maximum airfoil thickness 230 of the adjacent power sections. The ridges may run for only a portion of the chord, and might not extend to the leading and trailing edges. Ridges extending to the leading and/or trailing edge might not extend out beyond the leading and trailing edges (of the adjacent power sections). Yet other ridges might not be fully aligned with the chord line. They may be configured with a single geometrical shape across the length of the chord line, or a shape that varies either smoothly or abruptly.

The protrusion forms of aerodynamic section dividers of additional embodiments may be in many sizes, shapes, and configurations. For example, the protrusions may be isolated protruding discontinuities, typically being on the forward half of the blade (i.e., nearer to the leading edge than the trailing edge). These isolated protruding discontinuities may be sinusoidal bumps (400 in FIG. 6), or be bumps in the shape of buttons (402 in FIG. 7) (i.e., a protrusion having a flat upper surface and a sharp edge). Other shapes include those of light bulbs (i.e., a small stem supporting a larger ball on the end), hemispheres, mounds of various curvature, and cylinders.

These isolated protruding discontinuities may be of various sizes, such as the size of, or a substantial fraction of, the maximum airfoil thickness of the immediately adjoining portions of the adjoining power sections. The discontinuities may have a geometrical shape that forms sharp edges, or a smoothly varying shape that blends into the airfoil. Single isolated protruding discontinuities may used at each lateral location, or a series of them may be spread across the chord line on the low-pressure surface at one or more lateral locations. Different types of isolated protruding discontinuities may be applied at different lateral locations. The selection of isolated protruding discontinuity type and number at a given lateral location might depend upon the anticipated blade speed at that location, as each type (and number) of isolated protruding discontinuity might have an effectiveness level that varies with the speed of the blade at that location. This can be experimentally tested and optimized during blade design.

The isolated protruding discontinuities condition the fluid flow, effecting both boundary layers and the overall flow outside of boundary layers. Moreover, their wake serves to limit lateral flow of air between adjoining sections of the blade. As with the first embodiment, limiting the lateral flow improves the stall characteristics, providing a broad plateau of nearly constant lift to be generated over a broad range of angles of attack. This allows the blade to output a nearly constant torque even if the wind direction varies due to turbulence.

The protrusions may be a unitary part of the blade (e.g., ridges may be fabricated by increasing the size of the cross sectional airfoil shape at the ridge locations and producing a smooth, continuous transition from the blade to the top of the ridge, or may be fabricated using mold geometry, composite molding techniques, and layups). The protrusions, if not integral to the blade, may also be singular or multiple pieces that are attached to the blade. They may be composed of resin impregnated materials, engineered plastic, and/or thin sheet metal affixed to the remainder of the blade by adhesives, bolts, rivets, or other means.

The void forms of aerodynamic section dividers of additional embodiments may be in many sizes, shapes, and configurations, including ones that are the inverse of the protrusion forms of aerodynamic section dividers. For example, the voids may be in the form of a trough (408 in FIG. 8) that extends chord-wise from near the leading edge 210 to the trailing edge 212 across the low-pressure surface of the blade. The trough, which is somewhat the inverse of a ridge, is aligned with the chord line 208, and might extend out to the leading edge and the trailing edge.

The troughs may have a variety of geometrical shapes, including ones with sharp edges and ones that smoothly blend into the airfoil along the span. Troughs depths may vary to be larger or smaller fractions of the maximum airfoil thickness 230 of the immediately adjoining portions of the adjacent power sections. The troughs may run for only a portion of the chord, and might not extend to the leading and trailing edges. Troughs extending to the leading and/or trailing edge might or might not carve dents in the leading and trailing edges (of the adjacent power sections). Yet other troughs might not be fully aligned with the chord line. They may be configured with a single geometrical shape across the length of the chord line, or a shape that varies either smoothly or abruptly.

Other voids may be isolated void discontinuities, typically being on the forward half of the blade (i.e., nearer to the leading edge than the trailing edge). These isolated discontinuities may be holes in the form of divots (404 on FIG. 9), dimples (like golf ball dimples), cylindrical voids, or hemispherical holes.

A hole may be of various sizes, such as a substantial fraction of the maximum airfoil thickness of the immediately adjoining portions of the adjoining power sections. The holes may have a geometrical shape forming a sharp edge, or a smoothly varying shape that blends into the airfoil. Single isolated hole discontinuities may used at each lateral location, or a series of them spread across the chord line on the low-pressure surface. Different types of isolated void discontinuity may be used at different lateral locations. The selection of isolated void discontinuity type and number at a given lateral location might depend upon the anticipated blade speed at that location, as each type (and number) of isolated void discontinuity might have an effectiveness level that varies with the speed of the blade at that location. This can be experimentally tested and optimized during blade design.

The isolated void discontinuities condition the fluid flow, effecting both boundary layers and the overall flow outside of boundary layers. Moreover, their wake serves to limit lateral flow of air between adjoining sections of the blade. As with the first embodiment, limiting the lateral flow improves the stall characteristics, providing a broad plateau of nearly constant lift to be generated over a broad range of angles of attack. This allows the blade to output a nearly constant torque even if the wind varies due to turbulence.

It should be noted that protrusions and voids may be use in combination at a given lateral location for increased isolation between adjoining sections. For example, at a given lateral location, a series of isolated discontinuities may be spread across a portion of the chord line, wherein in series the isolated discontinuities alternate between protrusions and voids. Likewise, a pair of troughs could be placed immediately adjacent to a ridge to form a single aerodynamic section divider between two sections.

Other Variations

In a first variation of the various embodiments, the chord of the power generation sections increases or decreases smoothly from blade root to blade tip, and does so by less than 10%.

In a second variation of the various embodiments, each power generation section has a constant pitch angle, but the pitch angle of each power section varies with respect to the other power sections. The pitch angles are set such that each power section receives approximately the same overall effective angle of attack in use. For this variation, the use of the intermediate-dividers limits lateral airflow between the power sections despite their differing angles of attack with respect to one another.

In a third variation of the various embodiments, the angle of attack may be fixed at a level where small changes in the angle of attack do not change airfoil lift and drag forces. More specifically, the blades are fixed at level greater than 8 degrees or greater than 10 degrees (e.g., somewhere within a range of 8 to 12 degrees or 10 to 14 degrees).

In a fourth variation of the various embodiments, the blade leading edge is configured as a scalloped leading edge (having a leading edge of smoothly varying forward extension).

In a fifth variation, aerodynamic section dividers can be placed on the high-pressure side of the blade, particularly if the high-pressure side is also a convex surface. This can be done in conjunction with low-pressure side aerodynamic section dividers, or in exclusive of them. Optionally, this variation can be done in conjunction with a blade angle of attack control system and actuation system (as described above) that is configured to implement aerodynamic braking. In aerodynamic braking, what is referred to the high-pressure side of the blade (i.e., the lower surface) is operated at lower pressures than what is referred to as the low-pressure side of the blade (i.e., the upper surface). Advantageously, aerodynamic section dividers would help avoid separation from the high-pressure side of the blade during aerodynamic braking.

In a sixth variation, every airfoil cross section along the span is pitched around a common point that forms a smoothly curved line along the span. The curved line may sweep forward, or backward, in the plane of rotation, or bend either up or down out of the plane of rotation.

In a seventh variation rather than the aerodynamic section dividers extending exactly along the chord line (i.e., perpendicular to the lateral axis), they instead extend up to 10 degrees off of the chord line (i.e., they are within 10 degrees of being perpendicular to the lateral axis).

Combinations of Elements

Embodiments of the invention can incorporate a wide variety of combinations of the elements described above. As an example, an embodiment may be a blade with a cross sectional airfoil shape characterized by a maximum lift to drag ratio greater than 45, a nose radius less than 8% of chord, a maximum thickness less than 15% of chord, a maximum camber greater than 8% of chord, and a maximum lift coefficient greater than 1.5, over substantially all of the blade length (e.g., over the power sections).

As another example, an embodiment may be a blade with a cross sectional airfoil shape characterized by a maximum lift to drag ratio greater than 100, a nose radius less than 6% of chord, a maximum thickness less than 15% of chord, a maximum camber greater than 8% of chord, and a maximum lift coefficient greater than 2.0, over substantially all of the blade length (e.g., over the power sections).

In yet another example, an embodiment may be a blade with a cross sectional airfoil shape characterized by a fixed angle of attack and a chord that decreases smoothly from root to tip by less than 10%, over substantially all of the blade length (e.g., over the power sections), with an aspect ratio greater than 4 but less than 6, where every airfoil cross section along the span is pitched around a common point that forms a straight line along the span, that operates at an advance ratio greater than 8.

It is to be understood that embodiments of the invention include both wind turbine blades and the wind turbines that incorporate the wind turbine blades. The invention comprises apparatus and methods for designing wind turbines and for producing them, as well as the apparatus and methods of the turbine itself. Additionally, the various embodiments of the invention can incorporate various combinations of these features with traditional wind turbine features and/or other systems incorporating them. In short, the above disclosed features can be combined in a wide variety of configurations within the anticipated scope of the invention.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A wind turbine blade extending from a wind turbine hub arranged to rotate about a horizontal axis, said blade comprising:
    a blade body having a leading edge, a trailing edge, a chord-wise dimension extending between said leading and trailing edges, and a lateral dimension extending from said hub generally perpendicular to said chord-wise dimension and said horizontal axis;
    wherein said blade body includes a plurality of laterally connected sections;
    wherein the laterally connected sections include a first section, a second section, and a first aerodynamic section divider intermediate to and adjoining the first and second sections;
    wherein each of the first and second sections extends chord-wise from said leading edge to said trailing edge of the blade body and has a lateral dimension extending generally perpendicular to said chord-wise dimension;
    wherein the first aerodynamic section divider is a protrusion extending lengthwise at least from said leading edge to said trailing edge, the protrusion having a smoothly contoured configuration that smoothly blends into the first and second sections along its entire length to direct chord-wise flow aerodynamically around the first aerodynamic section divider and form an aerodynamic barrier between said first and second sections, the protrusion aerodynamically isolating the first section from the second section such that the aerodynamic barrier limits lateral flow of air between the first and second sections while the first aerodynamic section divider is in use on the wind turbine;
    wherein the first and second sections have a smoothly varying airfoil shape which in chord-wise cross-section remains substantially constant over its entire lateral dimension;
    wherein the protrusion extends out from a surface of the blade body;
    wherein the protrusion is an elongated ridge having an apex extending generally chord-wise above said surface across the blade body at least from the leading and trailing edges; and
    wherein the ridge extends in front of the leading edge and past the trailing edge by an amount which is the same as the maximum airfoil thickness of the immediately adjoining portions of the adjacent sections.

2. The wind turbine blade of claim 1, wherein the plurality of laterally connected sections includes:
    a root section at an inner end of the blade body;
    a tip section at an outer end of the blade body;
    a plurality of power sections intermediate the root section and the tip section, wherein the power sections include the first and second sections, and wherein the plurality of power sections establish an innermost power section and an outermost power section;
    a second aerodynamic section divider located intermediate to and adjoining the root section and the innermost power section;
    a third aerodynamic section divider located intermediate to and adjoining the tip section and the outermost power section;
    wherein the first aerodynamic section divider is part of a set of one or more aerodynamic section dividers, each being located intermediate to and adjoining two adjoining power sections such that power sections in each pair of adjoining power sections are aerodynamically separated by a respective aerodynamic section divider; and
    wherein each aerodynamic section divider is a protrusion extending lengthwise at least from said leading edge to said trailing edge, each protrusion having a smoothly contoured configuration that smoothly blends into the power sections it adjoins along its entire length to direct chord-wise flow aerodynamically therearound and form an aerodynamic barrier between the two sections that said each aerodynamic section divider adjoins such that said each aerodynamic section divider aerodynamically limits the lateral flow of air between the two sections it adjoins while in use on the wind turbine.

3. The wind turbine blade of claim 2, wherein the power sections have respective chords and are characterized by lateral dimensions approximately the size of their chords.

4. The wind turbine blade of claim 2, wherein the second aerodynamic section divider is located within one power-section chord length of an inner end of the blade body, and the third aerodynamic section divider is located within one power-section chord length of an outer end of the blade body.

5. The wind turbine blade of claim 2, wherein the airfoil shape of the first and second sections is characterized by a lift-to-drag ratio greater than 45.

6. The wind turbine blade of claim 2, wherein the airfoil shape of the first and second sections is characterized by a lift coefficient greater than 1.5.

7. The wind turbine blade of claim 2, wherein the blade body is characterized by an aspect ratio that is less than 6.

8. A horizontal axis wind turbine generation system comprising a tower; a generator; and a plurality of wind turbine blades of claim 2.

9. The horizontal axis wind turbine generation system of claim 8, wherein the system is configured such that the plurality of blades rotates at the same speed as the generator.

10. The wind turbine blade of claim 2, wherein one or more of the aerodynamic section dividers include one or more separate pieces that are attached to the blade.

11. The wind turbine blade of claim 2:
   wherein each aerodynamic section divider extends out from a surface of the blade body and wherein each protrusion is an elongated ridge having an apex extending generally chord-wise above said surface across the blade body at least from the leading and trailing edges; and
   wherein each ridge includes first and second sides diverging downward from said apex to respective sections that the section divider of said each ridge adjoins.

12. The wind turbine blade of claim 2, wherein the power sections are pitch varied along a straight line extending laterally through the blade body.

13. The wind turbine blade of claim 12, wherein each power section has a constant pitch angle which varies with respect to the other power sections.

14. The wind turbine blade of claim 1, wherein said ridge includes first and second sides diverging downward from said apex to said first and second sections, respectively.

15. The wind turbine blade of claim 1, wherein the blade body is made of a material selected from a plastic, metal, composite, or resin impregnated material.

16. A wind turbine blade extending from a wind turbine hub arranged to rotate about a horizontal axis, said blade comprising:
   a blade body having a leading edge, a trailing edge, a chord-wise dimension extending between said leading and trailing edges, and a lateral dimension extending from said hub generally perpendicular to said chord-wise dimension and said horizontal axis;
   wherein said blade body includes a plurality of laterally connected sections;
   wherein the laterally connected sections include a first section, a second section and an aerodynamic section divider disposed intermediate and adjoining the first and second sections;
   wherein each of the first and second sections extends chord-wise between the leading edge and the trailing edge of the blade body and has a lateral dimension extending generally perpendicular to said chord-wise dimension;
   wherein said aerodynamic section divider extends out from a low-pressure surface of the blade body between said leading edge and said trailing edge and comprises a ridge having an apex extending generally chord-wise above said surface across the blade body, said ridge including first and second sides diverging downward from said apex that smoothly transition into said first and second sections, respectively;
   wherein each of the first and second sections forms an airfoil characterized by a chord-wise cross-sectional airfoil shape having a thickness and a straight chord line extending between the leading edge and the trailing edge of the blade body, the length of the chord line between the leading edge and the trailing edge at any given location along the lateral dimension of the first and second sections defining the chord of the airfoil; and
   wherein the chord-wise cross-sectional airfoil shape at any given location along the lateral dimension has a maximum thickness less than 15% of the chord.

17. The wind turbine blade of claim 16, wherein said ridge extends at least from said leading edge to said trailing edge.

18. The wind turbine blade of claim 17, wherein the first and second sides of said ridge diverge downward from said apex and smoothly transition into said first and second sections, respectively, from said leading edge to said trailing edge of the blade body.

19. The wind turbine blade of claim 16, wherein the aerodynamic section divider has a width which is the same as the maximum airfoil thickness of the immediately adjoining portions of the adjacent first and second sections.

20. The wind turbine blade of claim 16, wherein the aerodynamic section divider has a height which is as large as the maximum airfoil thickness of the immediately adjoining portions of the adjacent first and second sections.

21. The wind turbine blade of claim 16, wherein the aerodynamic section divider extends up to 10 degrees off the chord line.

* * * * *